United States Patent Office 2,894,956
Patented July 14, 1959

2,894,956

PREPARATION OF 1,4-OXATHIANE

James M. Whisenhunt, Freeport, Tex., assignor to The Dow Chemical Company, Midland, Mich., a corporation of Delaware No Drawing. Application April 2, 1956
Serial No. 575,302

9 Claims. (Cl. 260—327)

This invention relates to an improved process for preparation of 1,4-oxathiane (1,4-thioxane) and its derivatives having the general formula:

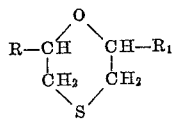

where R and $R_1$ represent hydrogen or alkyl groups having less than four carbon atoms. R and $R_1$ may or may not be the same.

More particularly, the invention relates to a process for the preparation of 1,4-oxathiane and its derivatives by the reaction, in a high boiling solvent, of a sulfide selected from the group consisting of sodium sulfide and potassium sulfide with a halogenated ether having the general formula:

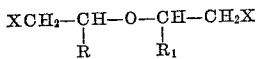

where X represents a halogen selected from the group consisting of chlorine, bromine and iodine and R and $R_1$ represent hydrogen or an alkyl group having less than 4 carbon atoms. R and $R_1$ may be the same or different.

The use of 1,4-oxathiane and its derivatives has been limited in commercial applications due to the lack of a practical and economical method for their production. In preparation of these compounds by the reaction of alcoholic potassium hydrosulfide with dihalodialkyl ethers, low yields are obtained and a high percentage of the reactants are lost in the formation of secondary products by side reactions. Prior investigators who have studied the reaction report yields of 1,4-oxathiane of around 30 percent and indicate that around 18 percent of other mercaptans are obtained. A further disadvantage is encountered in the recovery or separation of the 1,4-oxathiane from the reaction products. When alcohol is used as the reaction medium, it will distill over with the water-1,4-oxathiane azeotrope complicating the separation and its recovery.

It is, therefore, the main object of this invention to provide an improved process whereby 1,4-oxathiane and its derivatives can be easily and economically manufactured on commercial basis in high yields so that these compounds can be made available for extensive use in the chemical industry. By the improved process, these compounds can be prepared in yields of over 84 percent, the formation of secondary products practically eliminated, and the separation of the oxathianes simplified by the replacement of the alcohol with a high boiling solvent.

The above and other objects can be attained by the reaction of a halogenated ether with sodium sulfide or potassium sulfide in a medium consisting of a mixture containing 30 to 70 percent by volume of a glycol having a boiling point in the range of 150 to 350° C. and the remainder water at a temperature of 80 to 180° C. for a length of time sufficient to effect substantial reaction, and separating the product formed.

In the process it is essential that sodium or potassium sulfide and a high boiling diluent be used. Sodium hydrosulfide and potassium hydrosulfide will react with the halogenated ethers under the conditions of the process, but considerably lower yields of oxathiane are realized as secondary mercaptan products are formed. When alcohol is used as the reaction medium, even though sodium or potassium sulfide is reacted, yields of oxathiane obtained are around 50 percent instead of 85 percent.

The high boiling medium in which the reaction must be carried out should be inert with respect to the reaction and should dissolve the reactants. An aqueous solution of a glycol having a boiling point between 150 and 350° C., such as the glycols of ethylene, propylene, diethylene, and triethylene, meet these requirements. Glycols by themselves, while inert to the reaction, will not dissolve the sulfide so that water has to be added. It is preferred to use a mixture containing essentially equal volumes of water and glycol, though solutions containing from 30 to 70 percent glycol may be used. Higher concentrations of glycol are not desirable in that large amounts of diluent have to be used to dissolve the sulfide. The amounts of water that may be used are, likewise, limited in that, if dilute glycol solutions are used, the reaction temperature is lowered and the yields appreciably decreased.

The relative proportions of the medium and the reactants used are not critical. Sufficient amounts of diluent should be used to dissolve all of the sulfide. Excess amounts of the diluent, while not detrimental, should be avoided as it will increase the material which must be handled during separation of the products.

The reaction of the halogenated ether and the sulfide in the high boiling point medium can be easily carried out. Stoichiometric proportions of reactants may be used; however, a slight excess of sulfide is preferred as a higher yield of oxathianes can be obtained. The reactants are placed in the medium, heated, and refluxed at a temperature from 80 to 180° C., preferably from 95 to 110° C., for a sufficient length of time to effect substantially complete reaction between the reactants. Usually a reaction time of 20 to 40 hours is employed. The product formed can then be separated.

Oxathianes which form azeotropes with water may be readily separated from the reacted mass by distillation. The azeotrope of 1,4-oxathiane and water will distill off at about 95° C. at atmospheric pressure. The distillate upon condensation forms a heterogeneous mixture, a water phase and an oil phase. The oil phase will contain essentially all of the oxathiane and the unreacted halogenated ether. This layer can be dried with calcium or sodium sulfate and redistilled to separate the product from the other constituents. Additional product may be recovered from the water phase by redistillation or by extraction with diethyl ether; however, the small amount of product recoverable does not make this step practical.

The glycol used in the medium will not distill off with the water-oxathiane azeotrope and will remain in the residue. The glycol can be recovered and reused. Usually, it is only necessary to remove the salt formed by the reaction by filtration. If the diluent has been otherwise contaminated it may be necessary to redistill it.

The invention is further illustrated by the following examples.

*Example I*

Four moles of $Na_2S \cdot 9H_2O$ were pulverized in 1 liter of diethylene glycol. This slurry was placed in a 5 liter 3-neck pot equipped with a water condenser and a stirrer. One liter of water and 4 moles of dichlorodiethyl ether were added. This mixture was refluxed and stirred for about 30 hours at a temperature of 105° C. The condenser was placed downward and the water -1,4-oxathiane azeotrope was distilled off at about 95° C. Upon condensing the distillate, the azeotrope separated into 2 layers. The oil layer containing essentially all of the product and the unreacted ether was dried over calcium sulfate. This layer was then fractionated and the fraction boiling between 149–150° C. at 760 mm. of Hg, was collected. This fraction contained about 98–99 mole percent of 1,4-oxathiane and about 1–2 percent dichlorodiethyl ether.

A 95 percent conversion of the ether and a yield of finished product of 80 percent based upon the total ether charged were obtained.

The diluent remaining in the reaction flask after the distillation was recovered by removing the salt formed by the reaction by filtration and reused.

To compare the results obtained when ethyl alcohol is used as a diluent, 4 moles of $Na_2S \cdot 9H_2O$ were mixed with 1 liter of ethyl alcohol and placed in the reactor of Example I. To this solution 1 liter of water and 4 moles of dichlorodiethyl ether were added. The mixture was refluxed and stirred for about 30 hours. The solution was then distilled. An azeotrope containing 1,4-oxathiane, water, and ethyl alcohol was obtained. The distillate upon cooling separated into two phases, a water phase and an oil phase. The oil phase containing essentially all of the 1,4-oxathiane was dried over calcium sulfate and redistilled from the unreated dichlorodiethyl ether and alcohol. The fraction boiling between 149–150° C. at 760 mm. of Hg pressure was collected.

The recovered yield of 1,4-oxathiane was about 50 percent based upon the total ether charged.

*Example II*

Four hundred and eighty grams (2 moles) of $Na_2S \cdot 9H_2O$ 280 gm. (1.96 moles) of dichlorodiethyl ether, 500 ml. of triethylene glycol, and 500 ml. of water were reacted for 28 hours in a manner similar to that described in Example I. The reacted mixture was then distilled. The 1,4-oxathiane layer was dried over $CaSO_4$. The water layer was extracted with ether and the ether extract was likewise dried over $CaSO_4$. The extract and the 1,4-oxathiane layer were combined and redistilled to recover the oxathiane.

One hundred and seventy-five grams of 1,4-oxathiane product were recovered which represented 86 percent recovered yield.

*Example III*

Three hundred and sixty grams (1.5 moles) of $Na_2S \cdot 9H_2O$, 215 gms. (1.5 moles) of dichlorodiethyl ether, 250 ml. of propylene glycol, and 250 ml. of water were reacted for 34 hours in a manner similar to Example I. The 1,4-oxathiane formed was recovered by the method of Example I.

One hundred and twenty-six grams of 1,4-oxathiane product was obtained which represented a 80.5 percent recovered yield.

I claim:

1. In a process for preparation of 1,4-oxathiane and its derivatives having the general formula:

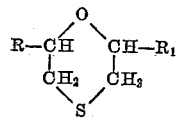

where R and $R_1$ represent a radical selected from the group consisting of hydrogen and alkyl groups having less than 4 carbon atoms, wherein a sulfide selected from the group consisting of sodium sulfide and potassium sulfide is intermixed in a diluent with a halogenated ether having a general formula:

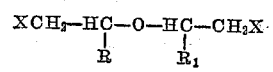

where X represents a halogen selected from the group consisting of Cl, Br, and I, and where R and $R_1$ represent a radical selected from the group consisting of hydrogen and alkyl groups having less than 4 carbon atoms and wherein the mixture is heated to react the sulfide with said ether to form the oxathiane product and the oxathiane product is recovered from the reacted mass, the improvement which comprises intermixing the sulfide and the ether in a solution consisting essentially of 30 to 70 percent by volume of an unsubstituted glycol having a boiling point in the range of 150 to 350° C. and the remainder water as said diluent and heating the sulfide and the said ether in the diluent to react the sulfide and said ether to form the oxathiane product at a temperature ranging from 80 to 180° C.

2. In a process for preparation of 1,4-oxathiane wherein a sulfide selected from the group consisting of sodium sulfide and potassium sulfide is intermixed in a diluent with a halogenated ether having a general formula:

$$XCH_2-H_2C-O-H_2C-CH_2X$$

where X represents a halogen selected from the group consisting of Cl, Br, and I, and wherein the mixture is heated to react the sulfide with the ether to form the 1,4-oxathiane and the 1,4-oxathiane recovered from the reacted mass, the improvement which comprises mixing the sulfide and the ether in a solution consisting of 30 to 70 percent by volume of an unsubstituted glycol having a boiling point in the range of 150 to 350° C. and the remainder water as the diluent and heating the sulfide and the said ether in the diluent to react the sulfide and said ether to form the oxathiane product at a temperature ranging from 80 to 180° C.

3. A process according to claim 2 wherein the halogenated ether and the sulfide are heated to react the sulfide with said ether at a temperature from 95 to 110° C.

4. In a process for preparation of 1,4-oxathiane wherein sodium sulfide is intermixed with dichlorodiethyl ether in a diluent, the mixture heated to react the sodium sulfide with the ether to form the 1,4-oxathiane, and the 1,4-oxathiane recovered from the reacted mass, the improvement which comprises mixing sodium sulfide with dichlorodiethyl ether in a solution consisting essentially of 30 to 70 percent by volume of diethylene glycol and the remainder water and heating the sulfide and said ether in the solution to react the sulfide with the said ether at a temperature ranging from 80 to 180° C.

5. A process according to claim 4 wherein the solution consists essentially of equal volumes of water and diethylene glycol and the sulfide and the ether are heated to react the sulfide with said ether at a temperature between 95 and 110° C.

6. In a process for preparation of 1,4-oxathiane wherein sodium sulfide is intermixed with dichlorodiethyl ether in a diluent, the mixture heated to react the sodium sulfide with the ether to form the 1,4-oxathiane, and the 1,4-oxathiane recovered from the reacted mass, the improvement which comprises mixing sodium sulfide with dichlorodiethyl ether, in a solution consisting essentially of 30 to 70 percent by volume of triethylene glycol and the remainder water and heating the sulfide and said ether in the solution to react the sulfide with the said ether at a temperature ranging from 80 to 180° C.

7. A process according to claim 6 wherein the solution consists essentially of equal volumes of water and triethylene glycol and the sulfide and the ether are heated to react the sulfide with said ether at a temperature between 95 to 110° C.

8. In a process for preparation of 1,4-oxathiane wherein sodium sulfide is intermixed with dichlorodiethyl ether in a diluent, the mixture heated to react the sodium sulfide with the ether to form the 1,4-oxathiane, and the 1,4-oxathiane recovered from the reacted mass, the improvement which comprises mixing sodium sulfide with dichlorodiethyl ether in a solution consisting essentially of 30 to 70 percent by volume of propylene glycol and the remainder water and heating the sulfide and said ether in the solution to react the sulfide with the said ether at a temperature ranging from 80 to 180° C.

9. A process according to claim 8 wherein the solution consists essentially of equal volumes of water and propylene glycol and the sulfide and the ether are heated to react the sulfide with said ether at a temperature between 95 and 110° C.

References Cited in the file of this patent

UNITED STATES PATENTS

| 2,508,005 | Ballard | May 16, 1950 |
| 2,662,086 | Hughes | Dec. 8, 1953 |
| 2,708,199 | Eby | May 10, 1955 |

FOREIGN PATENTS

| 459,668 | Canada | Sept. 13, 1949 |

OTHER REFERENCES

Clark: J Chem. Soc., 101:1806.